Aug. 30, 1932. E. J. FISCHER 1,874,269
SPRING DEVICE FOR AUTOMOTIVE VEHICLES
Filed Feb. 11, 1929 2 Sheets-Sheet 1

INVENTOR
Edward J Fischer
BY
ATTORNEYS.

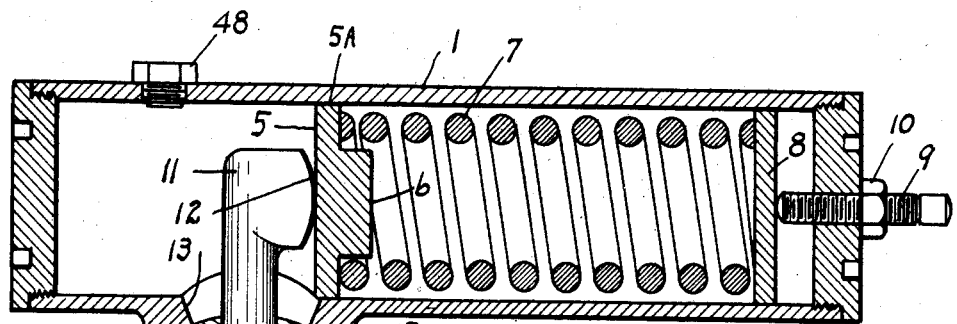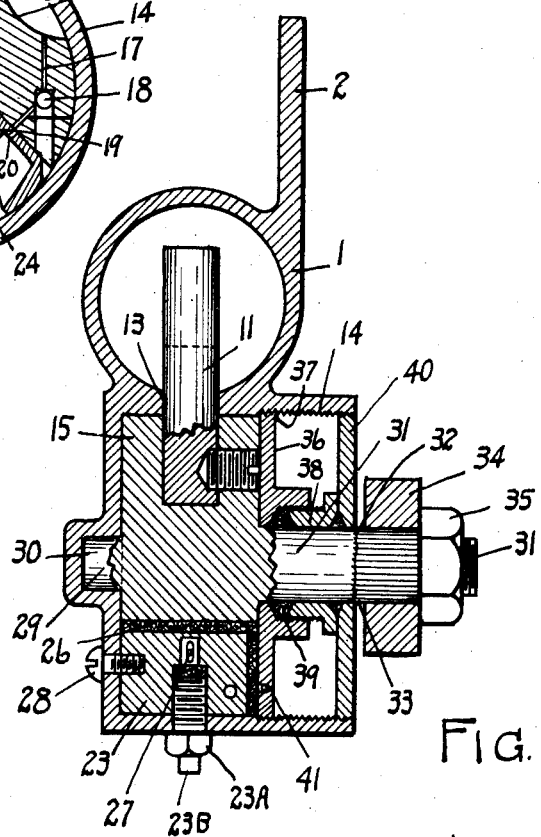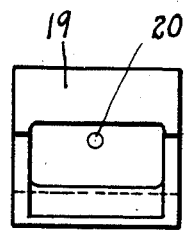

Patented Aug. 30, 1932

1,874,269

UNITED STATES PATENT OFFICE

EDWARD J. FISCHER, OF COVINGTON, KENTUCKY, ASSIGNOR OF ONE-HALF TO FRANK A. AMAN, OF CINCINNATI, OHIO

SPRING DEVICE FOR AUTOMOTIVE VEHICLES

Application filed February 11, 1929. Serial No. 339,093.

My invention relates to a spring of hydraulic type which may be employed without other resilient support for the front wheels of an automotive vehicle and which can be utilized to eliminate the use of a front axle of the vehicle.

It has been customary in the past to provide automotive vehicles with springs and augment the springs with shock absorbers. It is one of the objects of my invention to eliminate the use of springs altogether, providing instead a cushioned support of such type that it will function to resiliently mount the carrying wheels on the chassis frame and provide easy riding comfort without other springs being required. It is a further object to provide a cushioned support for the front wheels of the vehicle which will eliminate the necessity of a front axle.

The above and other specific objects to which reference will be made in the ensuing disclosure I accomplish by that certain combination and arrangement of parts of which I have shown a preferred modification.

Referring to the drawings:

Figure 3 is a sectional view of the spring shown in Figure 1 taken along the lines 3—3.

Figure 4 is a sectional view taken through the device along the lines 4—4 in Figure 2.

Figure 7 is a side elevation of the slide valves which cooperate with the piston shown in Figure 6.

Figure 1:
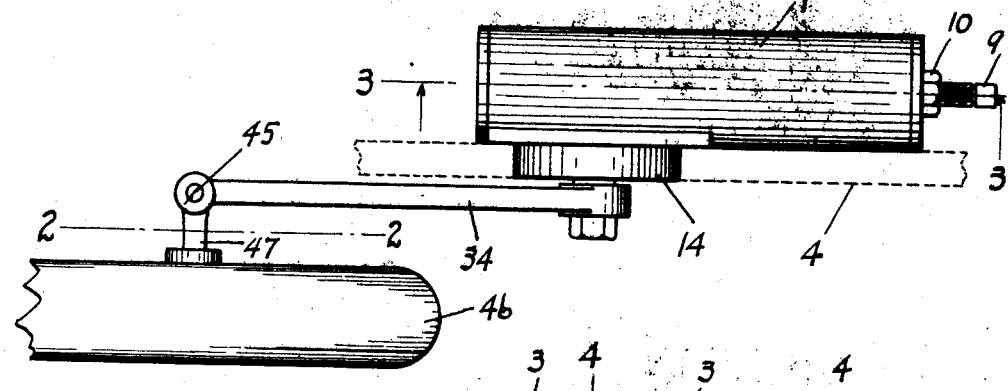
Figure 1 is a plan view of the spring forming the subject of my invention with a portion of a front wheel and of the chassis frame of a vehicle indicated.

The device has a cylinder 1 having a boss 2 provided with holes 3 through which bolts may be extended to firmly mount the device on the chassis frame of the vehicle as indicated at 4. Within the cylinder there is provided a piston 5 having slight clearance 5a at its periphery and having an annular flange 6 about which is mounted a spring 7 which is tensioned by the adjustment of a head 8 which can be moved relative to the spring by means of a stud 9 adapted to be fixedly retained by means of the lock nut 10.

Bearing against the piston 5 there is a rod 11 having a preferably rounded bearing surface 12 abutting the piston. In some modifications I may, however, substitute a roller for the rounded surface 12. I have not illustrated such modification as it comes within the scope of simple mechanical substitution. Extending from an opening 13 in the cylinder 1 through which the rod 11 extends, there is a circular casing 14 within which a rotary or rocking piston 15 is housed. The piston 15 has pockets 16 formed therein and ports 17 extending from the pockets, may be sealed with ball check valves 18 to prevent the return flow of liquid therethrough.

Cooperating with the piston 15 I may mount a pair of slide valves 19, one on each side. The slide valves have ports 20 extending therethrough and the piston has retaining bosses 21 having ports 22 therein to permit the exhausting of liquid pocketed in back of the slide valves during the operation of the device. The use of the slide valves in some instances will obviate the necessity of the ball check valves.

A barrier plate 23 is retained within the casing thereby providing the hydraulic chambers 24, one on each side of the barrier. Packing 25 is retained within a groove 26 in the barrier to prevent liquid from passing from one chamber 24 to the other excepting through the port 27 which extends through the barrier and allows the liquid to gradually force its way through from one chamber to the other. The barrier is held in place by a stud 23a. A screw-headed shaft 23b having a washer 23c thereon is locked in position by the nut 23d. The shaft 23b has a slot 23e therein which controls the amount of fluid passing through the port 27. The barrier 23 is also held rigidly within the casing as by a screw 28. A port 28a has a ball check valve 28b therein to block the passage of fluid from the chamber on the left to the chamber on the right, as indicated in Figure 3.

Formed integrally with the piston 15 is the shaft 29 which is rotatably retained within a recessed boss 30 extending from the center of the casing 14, and the shaft 31 which has a knurled collar 32 which engages a knurled face 33 of the link 34. The link is secured to the shaft 31 by a nut 35 which engages the threaded end of the shaft 31.

A circular partition 36 retains the piston 15 within the casing, the partition being threaded as indicated at 37 in internal threads of the casing so it may be adjusted for wear etc. A packing nut 38 is threaded within a threaded recess 39 in the partition 36 and I have also provided to prevent leakage, an outer partition 40 also engaging internal threads in the casing 14.

Any leakage which occurs through the packing nut 38 into the chamber formed between the partitions will be returned through a port 41 in the partition 36. The port 41 is provided with a ball check valve 42 to prevent return flow of the hydraulic fluid into the chamber between the partitions.

The end of the link 34 has a boss 43 through which a bolt 44 extends which mounts the steering knuckle 45. The wheel 46 is mounted on the spindle 47 of the steering knuckle in the usual manner, it being a feature of my invention that the front axle of the vehicle may thus be dispensed with.

Figure 2:
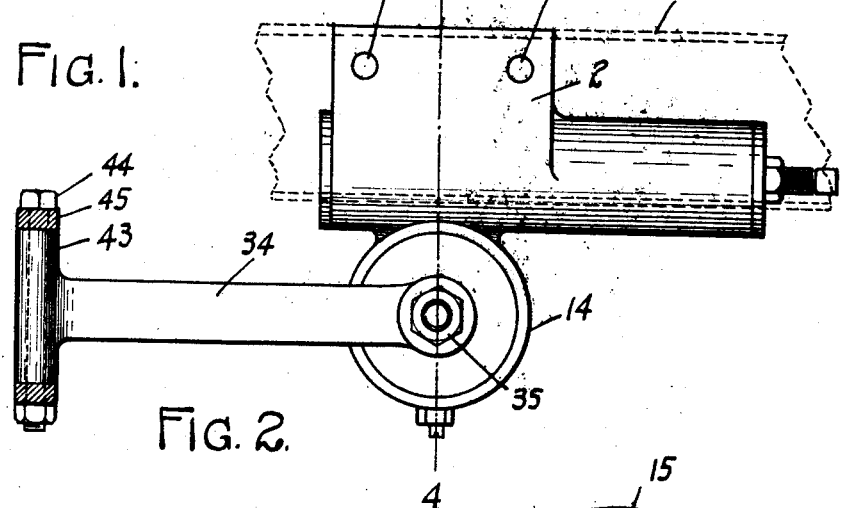
Figure 2 is a side elevation of the spring shown in Figure 1 with a section through the steering knuckle as indicated by the lines 2—2 in Figure 1 also shown.
Figure 5:
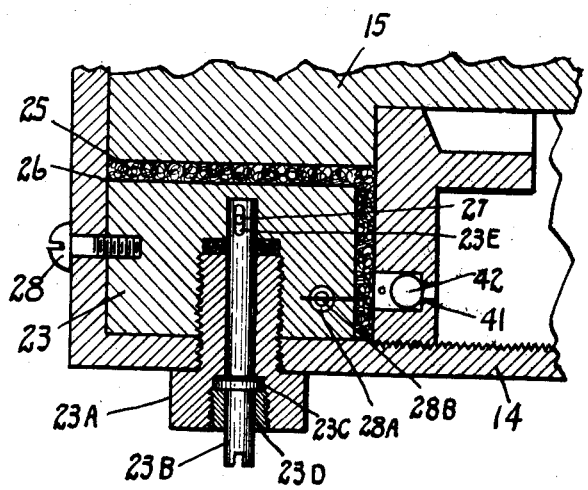
Figure 5 is a sectional view of the device taken along the lines 5—5 in Figure 3.
Figure 6:
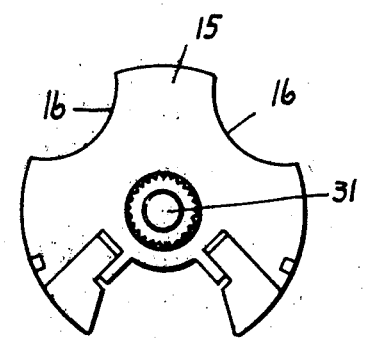
Figure 6 is a side elevation of the rotary piston enclosed within the housing of the device.

The operation of the device is as follows:— When the front wheel moves relative to the vehicle frame, the rotary piston is rocked either to the right or left. Some suitable hydraulic fluid, such as a lubricating oil, is filled into the cylinder 1 as through a plug 48. The cylinder acts as a reservoir for the fluid. Supposing the link as indicated in Figure 2 is elevated. This will cause the rotary piston to rock clockwise as indicated in Figure 3. An expansion stroke will occur in the pocket at the left of the piston rod and in the cylinder, and the piston within the cylinder will be moved to the right thereby compressing the spring. A compression stroke will occur in the chamber to the right of the baffle. The compressed fluid will then pass through the port in the baffle and supply fluid to the chamber on the left. Meanwhile the side valve 19 of the cylinder on the left will be moved up to cause the port 20 to register with the passage 17 and any deficiency in fluid in the chamber on the left will be supplied from the reservoir or through the passage 28a. On the rebound of the wheel the opposite cycle will occur and there will be a compression stroke in the cylinder caused by the expansion of the spring. A deficiency in fluid in the chamber on the right will be supplied through the right hand ports 17 and 20. At the same time there will also be a compression stroke in the chamber at the left of the barrier. The passage 28 will be blocked so that the chamber on the left will thus take up the rebound stroke without such a great loss of fluid.

Thus in the cycle of operation described the upward movement of the wheel is cushioned by a combination of the compression of the spring and the hydraulic compression in the chamber to the right of the barrier and the rebound is cushioned by the hydraulic compression in the chamber at the left of the barrier. It is for this reason that the passage 28a is blocked by the ball check 28b.

While I prefer to mount the cylinder on the chassis frame, the operation of the cushioning device is such that the parts may be reversed and the same effect will be produced. Thus the cylinder may be formed with a boss for attachment to the steering knuckle and the link may be extended to the chassis frame.

Having thus described my invention, what I claim as new and desire to secure by Letters Patent, is:—

1. A hydraulic spring device comprising a hydraulic cylinder with a spring actuated piston therein, a hydraulic casing having a rocking piston therein, connections between said spring actuated piston and said rocking piston, a baffle in said casing forming hydraulic pressure chambers, said rocking piston having ports and valves carried by said rocking piston to induce cycles of hydraulic pressure counterbalancing the movement of said spring actuated cylinder.

2. A cushioned support forming the sole connecting support between a front wheel of a vehicle and the chassis frame, having a hydraulic cylinder with a spring actuated piston therein, a casing connected with said hydraulic cylinder, a rocking piston in said casing, and a barrier within said casing forming opposed pressure chambers wherein the rocking of said piston provides counterbalancing hydraulic resistance to the movement of said spring actuated piston, said rocking piston having ports extending therethrough and slide valves having ports carried by said rocking piston.

3. A cushioned support forming the sole connecting support between a front wheel of a vehicle and the chassis frame, having a hydraulic cylinder with a spring actuated piston therein, a casing connected with said hydraulic cylinder, a rocking piston in said casing, and a barrier within said casing forming opposed pressure chambers wherein the rocking of said piston provides counterbalancing hydraulic resistance to the movement of said spring actuated piston, said rocking piston having ports extending therethrough and slide valves having ports carried by said rocking piston, and a link having a rigid connection with said rocking piston and having a connection with the front wheel of the vehicle.

4. A hydraulic spring for a vehicle comprising a hydraulic cylinder with a spring actuated piston therein, an opening in said cylinder and a casing connected therewith, a rocking piston having reserve fluid pockets in said casing, means forming pressure chambers in said casing and a piston rod connecting said spring actuated piston and said rocking piston, said rocking piston having ports extending therethrough connecting with said reserve pockets.

5. A hydraulic spring for a vehicle comprising a hydraulic cylinder with a spring actuated piston therein, an opening in said cylinder and a casing connected therewith, a rocking piston in said casing, means forming pressure chambers in said casing and a piston rod connecting said spring actuated piston and said rocking piston, said rocking piston having ports extending therethrough, and slide valves having ports to register with said first mentioned ports during the cycles of operation within said chambers.

6. A hydraulic spring for a vehicle comprising a hydraulic cylinder with a spring actuated piston therein, an opening in said cylinder and a casing connected therewith, an adjustable partition for said casing, a rocking piston and shaft in said casing, means in conjunction with said rocking piston forming pressure chambers in said casing, said adjustable partition forming a low pressure chamber adjacent to said pressure chambers within said casing.

7. A hydraulic spring for a vehicle comprising a hydraulic cylinder with a spring actuated piston therein, an opening in said cylinder and a casing connected therewith, an adjustable partition for said casing, a rocking piston and shaft in said casing, means in conjunction with said rocking piston forming pressure chambers in said casing, said adjustable partition forming a low pressure chamber adjacent to said pressure chambers within said casing to retain leakage from said pressure chambers.

8. A hydraulic spring for a vehicle comprising a hydraulic cylinder with a spring actuated piston therein, an opening in said cylinder and a casing connected therewith, an adjustable partition for said casing, a rocking piston and shaft in said casing, means in conjunction with said rocking piston forming pressure chambers in said casing, said adjustable partition forming a low pressure chamber adjacent to said pressure chambers within said casing to retain leakage from said pressure chambers, and means in said pressure chamber to return fluids from said low pressure chamber to said pressure chambers.

EDWARD J. FISCHER.